April 1, 1969 — D. R. HUMPHREYS — 3,435,706
TORQUE REACTIVE WAVE GENERATORS
Filed Dec. 8, 1966 — Sheet 1 of 2

Inventor
Donald R. Humphreys
By his Attorney
Carl E. Johnson

United States Patent Office 3,435,706
Patented Apr. 1, 1969

3,435,706
TORQUE REACTIVE WAVE GENERATORS
Donald R. Humphreys, Topsfield, Mass., assignor to USM Corporation, Flemington, N.J., a corporation of New Jersey
Filed Dec. 8, 1966, Ser. No. 600,153
Int. Cl. F16h *35/02*
U.S. Cl. 74—640                    5 Claims

ABSTRACT OF THE DISCLOSURE

A mechanical transmission having, in coaxial relation, a circular member and a radially deflectable tubular member engaging the circular member at spaced circumferential localities, one reacting on the other, and cam controlled elements for maintaining torque handling capacity by automatically varying the effective diameter of the flexible member in response to different torque load requirements.

BACKGROUND OF THE INVENTION

This invention relates to rotary drive mechanism and more particularly to gearing of the strain wave or harmonic drive type. The invention is directed to providing improved means responsive to change in input torque for suitably controlling the operating or interengaging pressure between a deflectable member and a rigid circular member coacting therewith. It will be appreciated that the invention is not limited to the embodiments selected herein for the purposes of illustration, nor even necessarily to use in harmonic drive gearing.

In harmonic drive transmission, for instance as disclosed in United States Letters Patent No. 2,906,143 issued upon an application filed in the name of C Walton Musser, concentric gears are interengaged at spaced circumferential locations. These localities are advanced by a wave of radial deflection in one of the gearing elements commonly termed a flexspline which reacts on a rigid circular spline. The means, with which this invention is especially concerned, is an improved wave generator for effecting and progressing such deflection in the flexspline. In some respects the invention will be recognized as similar to the wave generator of variable diameter disclosed in United States Letters Patent No. 3,139,770 issued upon an application filed in the name of C Walton Musser.

In general, harmonic drive transmissions are characterized by their compact size in relation to load capacity, many utilizing rather small circular pitch and large numbers of teeth as compared to conventional or nondeflected gearing. It is accordingly desirable to insure that adequate, if not full, tooth contact be maintained under all anticipated load conditions.

SUMMARY OF THE INVENTION

A primary object of the present invention is to provide in a transmission an improved wave generator of reliable and simple construction capable of adjusting to effective diameter in response to the demand of load, thus compensating for radial elastic deflection of other parts which normally would provide limited torque handling ability.

A further purpose of the invention is to provide automatic means for reducing any tendency in the contacting teeth of fine tooth gearing to slip out of mesh with a cooperating gear when output torque is increased.

To the foregoing ends, and in accordance with a feature of the invention, there is provided in a harmonic drive comprising in coaxial relation a flexspline having teeth meshing at spaced circumferential localities with a circular spline, a wave generator means including at least two radially symmetrical members cooperative with the flexspline for variably determining its major diameter, and a rotary cam having working surfaces shaped to engage and force the members along that diameter in accordance with the degree of input torque to be transmitted to the wave generator means.

BRIEF DESCRIPTION OF THE DRAWINGS

The foregoing and other features of the invention, together with novel details in construction and combination of parts, will now be more particularly described in connection with illustrative embodiments, and with reference to the accompanying drawings thereof, in which.

DESCRIPTION OF THE PREFERRED EMBODIMENTS

While the invention will be described with reference to 2-lobe type harmonic drives, it will be understood that the wave generator of the invention is adaptable to provide, my modified cam shape, a drive employing three or more lobes. It will also be understood that, though not so herein shown, the invention may also be employed when the wave generator is external to the flexible member.

Figure 1:
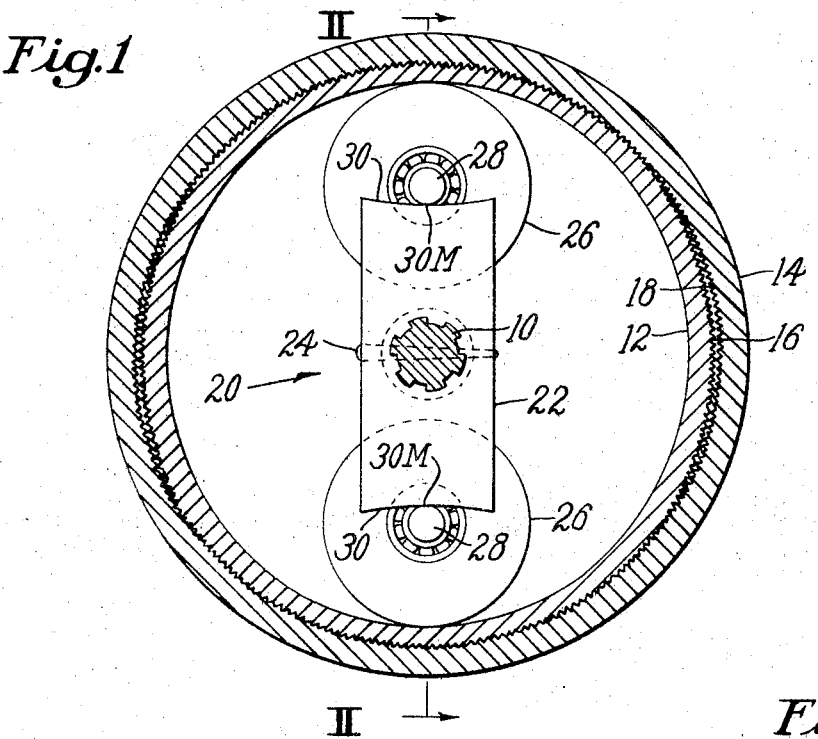
FIG. 1 is a transverse section of a harmonic drive incorporating a torque responsive wave generator of the type for imparting elliptoidal shape.
Figure 2:
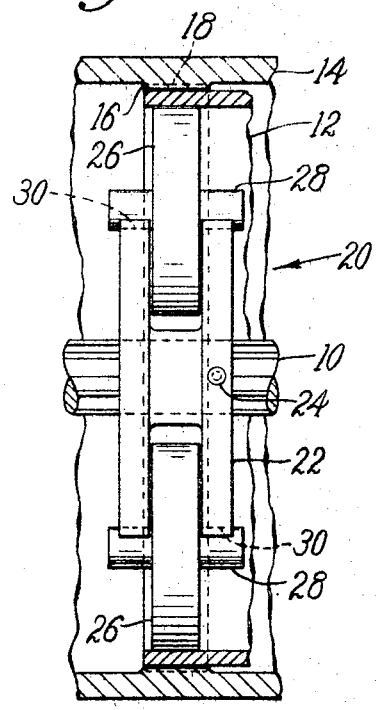
FIG. 2 is a section taken along line II—II of FIG. 1.
Figure 3:
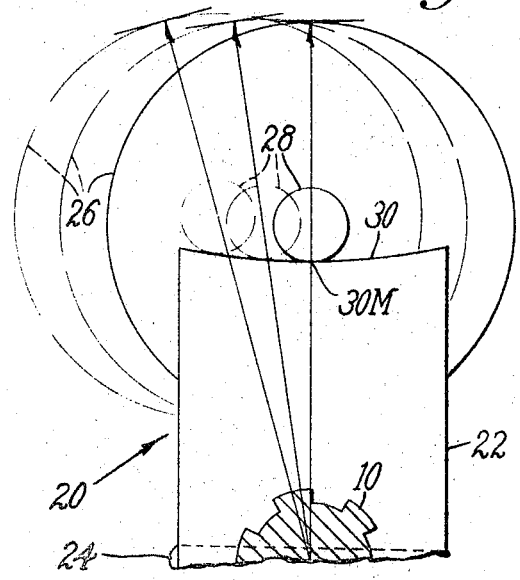
FIG. 3 is an enlarged schematic view of a portion shown in FIGS. 1 and 2 and indicating successive changes in effective wave generator radii.

Referring first to FIGS. 1–3, an input shaft 10 is disposed in coaxial relation to a tubular flexspline 12 and a rigid circular spline 14. The flexspline 12 has spline teeth 16 meshing at diametrically opposite localities along a major axis (shown vertical in FIG. 1) with spline teeth 18 of the rigid circular spline 14. For variably determining the dimension of the major diameter of the flexspline 12 and insuring its continued effective meshing with the circular spline 14 despite an increase in output torque, wave generator means, generally designated 20 and next to be described, is provided.

The wave generator means 20 comprises a cam 22 in driven relationship to the shaft 10, the cam being splined thereon and prevented from being axially displaced by a pin 24, and a pair of rollers 26, 26 respectively having axles 28 parallel to the shaft 10 and which are movable along opposite, concave working surfaces 30, 30 of the cam. Each of the surfaces 30 is symmetrical with respect to the axis of the shaft 10, extends transversely thereof, and is equally spaced therefrom. The midpoints 30M of the respective surfaces 30 are diametrically spaced a minimum distance apart sufficient to radially deflect the flexspline 12 via the perimeters of the rollers 26 and thus effect intermeshing of the teeth 16, 18 under conditions of light and no output load.

When output load is increased, the input shaft 10 is subjected to increased torque. In response to this and assuming the shaft 10 is rotating clockwise as viewed in FIG. 3 the axles 28 will move away from the midpoints 30M of the surfaces 30 (to the left as shown in FIG. 3) to spread the axles 28 outwardly along a new enlarged major diameter. This results in the peripheral contact points of the rollers 26 with the internal wall of the flexspline being forced apart thereby insuring a continued maintenance of tooth meshing on the major axis of the flexspline. Upon lowering output torque, the action is automatically reversed, the axles 28 returning toward the midpoints 30M of the cam surfaces 30 to reduce the pressure of tooth engagement.

Figure 4:
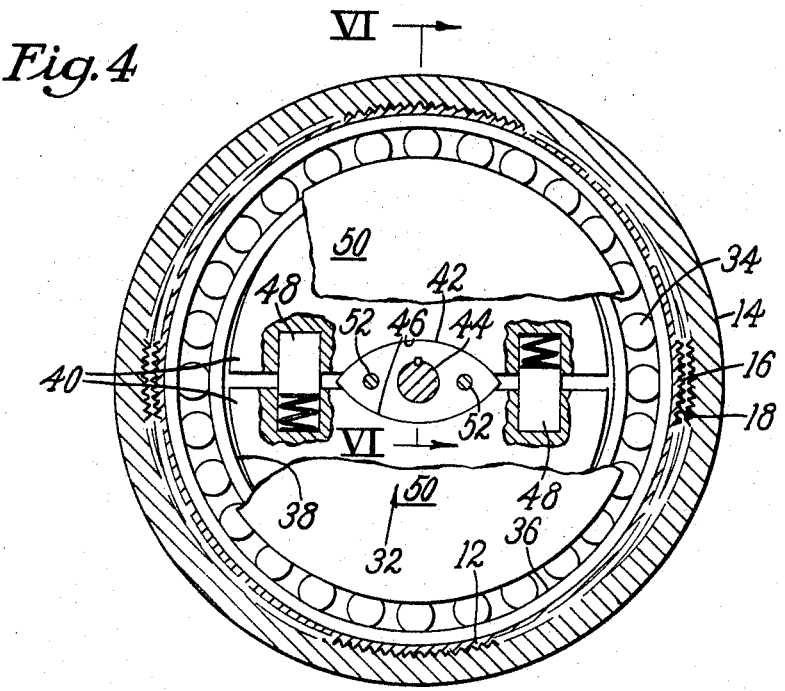
FIG. 4 is a transverse section, with portions broken away, of a harmonic drive incorporating an alternate form of torque responsive wave generator.
Figure 5:
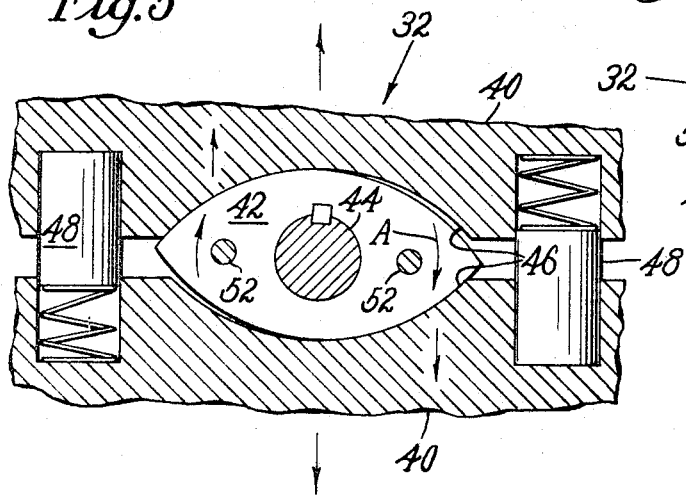
FIG. 5 is an enlarged view of cam means shown in FIG. 4 when increasing a major diameter.
Figure 6:
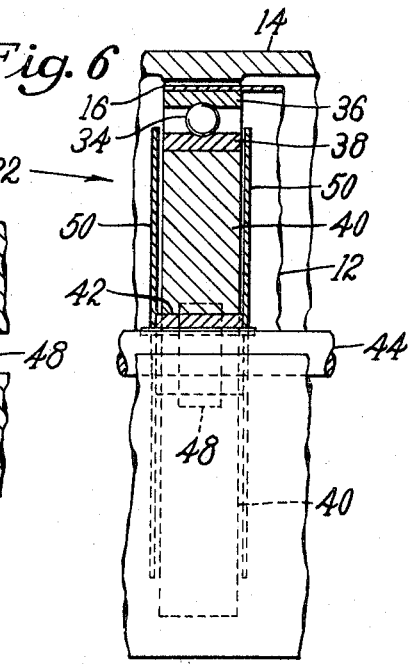
FIG. 6 is a partial section taken on the line VI—VI of FIG. 4.

An alternate form of torque reactive wave generator will next be described with reference to FIGS. 4–6 inclusive, like parts of the harmonic drive assembly bearing like reference characters. In this instance, instead of employing only two rollers of sizeable diameter for imparting directly to the flexspline 12, a wave generator assembly generally designated 32 comprises a plurality of bearing balls 34 (FIGS. 4 and 6) disposed between an outer race 36 bearing in the flexspline and an inner bearing race 38. The latter is fitted over symmetrical complemental portions 40, 40 substantially defining an elliptoid, the major axis of which is shown vertical in FIG. 4. The portions 40 are adapted to be forced further apart along a major axis as will be explained, but at zero or light load, an elliptical plug or cam 42 keyed to an input shaft 44 has contacted two opposite localities with confronting inner arcuate surfaces 46, 46 respectively formed in the portions 40.

The cam 42 is symmetrical about the axis of the shaft 44. In the position of light or no load, the minor axis of the cam 42 is alined with the major axis of the elliptoid 40, 40 and diminished to provide the latter with the desired minimum major axis dimension appropriate to no or light load operation. As shown in FIG. 5 an enlarged major axis is automatically effected in elliptoid 40, 40 and hence in the wave generator assembly 32, when output load is increased. This is because the shaft 44 is subjected to increased torque (clockwise in FIG. 5) causing the cam 42 to rotate and angularly shift clockwise with respect to the portions 40. Hence these portions are spread apart to increase the major diameter of the wave generator, the resultant new shape of the flexspline 12 urging the teeth 16 into fully meshing relation with the circular spline teeth 18 at diametrically opposite localities. The major diameter increase may be on the order of .002–.005", for example.

In order to assist the portions 40, when load is reduced, to respond by returning the wave generator major axis toward its no-load position, there is optionally provided a pair of spring plungers 48, 48 nested in the confronting faces of the portions 40, 40 at opposite sides of the cam 42. The arrangement is such that both the plungers 48 tend to spread the portions 40 apart, and one plunger will yieldingly oppose relative turning of the cam 42 whether change in torque be an increase or a decrease.

Preferably, to keep portions 40 axially alined and incidentally to guard against foreign matter lodging between them, circular disks or shields 50, 50 (FIGS. 4 and 6) are carried at each side of the wave generator 32 by means of screws 52, 52 extending through the cam 42.

Having thus described my invention, what I claim as new and desire to secure by Letters Patent of the United States is:

1. In a harmonic drive type transmission, a rotary input element, a tubular flexspline coaxial therewith for reacting on a circular spline, and a torque reactive wave generator means for propagating a circumferential wave of radial deflection in the flexspline, said means including at least two dynamic radially symmetrical members cooperative with the flexspline for variably determining its major axis, and cam means driven by the input element and having working surfaces shaped to engage and force the respective members along said axis according to the amount of torque exerted by the input element.

2. A transmission as set forth in claim 1 wherein said symmetrical members are complemental portions substantially defining an elliptoid.

3. A transmission as set forth in claim 2 wherein said cam means has elliptoidal working surfaces which are arranged to cooperate with confronting inner arcuate surfaces formed in said complemental portions respectively.

4. A transmission as set forth in claim 3 wherein the major axis of the elliptoid defined by the complemental portions is substantially aligned with the minor axis extending between the working surfaces of said cam.

5. In a transmission comprising a rotary input element, a radially flexible tubular member, and a coaxial circular member, a torque reactive wave generator means for propagating a wave of radial deflection in the flexible tubular member to effect its engagement with and reaction on the circular member at spaced circumferential localities, said means including at least two dynamic radially symmetrical members cooperative with the flexible tubular member for variably determining its dimension along a major axis, and a cam driven by the input element and having arcuate surfaces disposed to displace the respective members radially according to the amount of torque exerted by the input element.

References Cited

UNITED STATES PATENTS

| | | | |
|---|---|---|---|
| 3,051,282 | 8/1962 | Greene | 192—8 |
| 3,119,283 | 1/1964 | Bentov | 74—640 |
| 3,148,560 | 9/1964 | Woodward | 74—640 X |
| 3,161,081 | 12/1964 | Musser | 74—640 |
| 3,166,949 | 1/1965 | Lapp | 74—640 X |
| 3,335,831 | 8/1967 | Kalns | 192—8 |

ARTHUR T. McKEON, *Primary Examiner.*